US008831819B2

(12) United States Patent
Saito et al.

(10) Patent No.: US 8,831,819 B2
(45) Date of Patent: Sep. 9, 2014

(54) ABNORMALITY DETERMINATION DEVICE AND METHOD OF LONGITUDINAL ACCELERATION SENSOR

(75) Inventors: Takashi Saito, Fuji (JP); Kaiji Itabashi, Gotenba (JP)

(73) Assignee: Toyota Jidosha Kabushiki Kaisha, Toyota-shi, Aich-ken (JP)

( * ) Notice: Subject to any disclaimer, the term of this patent is extended or adjusted under 35 U.S.C. 154(b) by 0 days.

(21) Appl. No.: 13/637,407

(22) PCT Filed: Apr. 14, 2011

(86) PCT No.: PCT/JP2011/059262
§ 371 (c)(1),
(2), (4) Date: Sep. 26, 2012

(87) PCT Pub. No.: WO2012/140763
PCT Pub. Date: Oct. 18, 2012

(65) Prior Publication Data
US 2014/0046532 A1      Feb. 13, 2014

(51) Int. Cl.
  *G07C 5/00*       (2006.01)
  *B60W 50/02*      (2012.01)
  *B60T 8/88*       (2006.01)
  *G01P 21/00*      (2006.01)
  *G01P 7/00*       (2006.01)
  *B60W 40/107*     (2012.01)

(52) U.S. Cl.
  CPC ................ *G07C 5/00* (2013.01); *B60W 50/02* (2013.01); *B60T 8/88* (2013.01); *G01P 21/00* (2013.01); *B60W 40/107* (2013.01); *G01P 7/00* (2013.01); *B60W 50/0205* (2013.01); *B60T 2270/406* (2013.01); *B60T 8/885* (2013.01)
  USPC ......................................... 701/30.4; 303/122

(58) Field of Classification Search
  CPC ................................... B60T 8/88; B60T 8/885
  USPC .............. 701/30.4, 70, 76; 280/735; 303/177, 303/122.06, 122, 186; 73/1.38, 115.08
  See application file for complete search history.

(56) References Cited

U.S. PATENT DOCUMENTS 5,483,452 A * 1/1996 Tanaka ............................ 701/70
(Continued)

FOREIGN PATENT DOCUMENTS

| DE | 198 59 112 A1 | 7/1999 |
| DE | 102 38 787 A1 | 3/2003 |
| EP | 1 698 903 A1 | 9/2006 |
| JP | 1-195168 | 8/1989 |
| JP | 11-190741 | 7/1999 |
| JP | 11-295337 | 10/1999 |

(Continued)

*Primary Examiner* — Marthe Marc-Coleman
(74) *Attorney, Agent, or Firm* — Finnegan, Henderson, Farabow, Garrett & Dunner, LLP

(57) ABSTRACT

The running control device and method according to the present invention are those for determining abnormality of a longitudinal acceleration sensor which detects vehicular longitudinal acceleration that is used in a vehicle running control. An integrated value of a vehicular longitudinal acceleration that is detected by the longitudinal acceleration sensor is calculated, and determination whether or not the longitudinal acceleration sensor is abnormal is conducted on the basis of the integrated value and a vehicle speed based on vehicle wheel speeds. The calculation of the integrated value is initiated when a situation where the vehicle speed based on vehicle wheel speeds is zero and the increasing rate of the detected vehicular longitudinal acceleration is equal to or larger than a reference value for the increasing rate continues for a period which is equal to or larger than a reference value for the initiation of calculation.

15 Claims, 7 Drawing Sheets

(56) References Cited

U.S. PATENT DOCUMENTS

| | | |
|---|---|---|
| 6,253,602 B1 | 7/2001 | Uchida |
| 6,915,200 B2 * | 7/2005 | Tsuchiya ................ 701/70 |
| 7,599,763 B2 | 10/2009 | Matsumoto et al. |
| 2003/0038537 A1 | 2/2003 | Okai |
| 2008/0041135 A1 | 2/2008 | Okai |

FOREIGN PATENT DOCUMENTS

| | | |
|---|---|---|
| JP | 2003-63375 | 3/2003 |
| JP | 2004-168148 | 6/2004 |
| JP | 2006-69472 | 3/2006 |
| JP | 2008-94124 | 4/2008 |
| WO | WO 2005/064350 A1 | 7/2005 |

* cited by examiner

ABNORMALITY DETERMINATION DEVICE AND METHOD OF LONGITUDINAL ACCELERATION SENSOR

CROSS-REFERENCE TO RELATED APPLICATIONS

This application is a national phase application of International Application No. PCT/JP2011/059262, filed Apr. 14, 2011, the content of which is incorporated herein by reference.

TECHNICAL FIELD

The present invention relates to a longitudinal acceleration sensor for detecting vehicular longitudinal acceleration which is used in running control of a vehicle and, more particularly, to an abnormality determination device and method for a longitudinal acceleration sensor.

BACKGROUND ART

There have been proposed various abnormality determination devices which are configured to determine abnormality of a longitudinal acceleration sensor for detecting a vehicular longitudinal acceleration that is used in running control of a vehicle. For example, it is known to determine abnormality of a longitudinal acceleration sensor by means of comparison of a vehicle speed based on a vehicular longitudinal acceleration and a vehicle speed based on vehicle wheel speeds. See Patent Reference 1. A vehicle speed based on a vehicular longitudinal acceleration is calculated by integrating vehicular longitudinal acceleration detected by a longitudinal acceleration sensor. A vehicle speed based on vehicle wheel speeds is calculated on the basis of vehicle wheel speeds detected by vehicle wheel sensors.

CITATION LIST

Patent Literature 1: Japanese Patent Application Laid-open Publication No. Hei 01-195168

SUMMARY OF INVENTION

Technical Problem

As is well known in the art, longitudinal acceleration sensors can detect even a very small vehicular longitudinal acceleration, while on the other hand, vehicle wheel sensors cannot detect a vehicle wheel speed at very low vehicle speed. For that reason, in conventional abnormality determination devices for longitudinal acceleration sensors, integration of longitudinal acceleration is initiated after vehicle wheel speeds have exceeded a minimum value within a range of vehicle wheel speed which vehicle wheel sensors can detect.

When a vehicle starts running, however, vehicular longitudinal acceleration increases even in a very low vehicle speed range where each vehicle wheel sensor cannot detect a vehicle wheel speed. Consequently, if integration of longitudinal acceleration is initiated after vehicle wheel speeds have exceeded a minimum value within a range of vehicle wheel speed which vehicle wheel sensors can detect, the resultant integrated value of longitudinal acceleration does not include the longitudinal acceleration for the period from the time point when longitudinal acceleration begin to increase to the time point when the integration is initiated. Accordingly, a vehicle speed based on a vehicular longitudinal acceleration includes an error corresponding to un-integrated longitudinal acceleration. Therefore, an erroneous judgment may be made that a longitudinal acceleration sensor is abnormal in spite of the fact that it is normal. Alternatively, an erroneous judgment may be made that a longitudinal acceleration sensor is normal in spite of the fact that it is abnormal.

If integration of longitudinal acceleration is initiated before a vehicle starts running, unstable outputs of a longitudinal acceleration sensor are integrated under an unstable operational situation just after the longitudinal acceleration sensor starts detection. Accordingly, a vehicle speed based on a vehicular longitudinal acceleration includes an error due to unstable outputs, which may cause an erroneous judgment as to whether or not a longitudinal acceleration sensor is abnormal.

A primary object of the present invention is to reduce an error included in a vehicle speed based on a vehicular longitudinal acceleration which is detected by a longitudinal acceleration sensor so as to reduce a possibility that an erroneous judgment is made as to whether or not a longitudinal acceleration sensor is abnormal.

Solution to Problem and Advantageous Effects

The present invention provides an abnormality determination device for a longitudinal acceleration sensor which detects a vehicular longitudinal acceleration that is used in a vehicle running control, the abnormality determination device calculating an integrated value of the vehicular longitudinal acceleration that is detected by the longitudinal acceleration sensor and determining whether or not the longitudinal acceleration sensor is abnormal on the basis of the integrated value and a vehicle speed based on vehicle wheel speeds, wherein the calculation of the integrated value is initiated when a situation where the increasing rate of the vehicular longitudinal acceleration that is detected by the longitudinal acceleration sensor is equal to or larger than a reference value for the increasing rate continues for a period which is equal to or larger than a time reference value for the initiation of calculation.

The present invention also provides an abnormality determination method for a longitudinal acceleration sensor which detects a vehicular longitudinal acceleration that is used in a vehicle running control, the abnormality determination method calculating an integrated value of the vehicular longitudinal acceleration that is detected by the longitudinal acceleration sensor and determining whether or not the longitudinal acceleration sensor is abnormal on the basis of the integrated value and a vehicle speed based on vehicle wheel speeds, wherein the calculation of the integrated value is initiated when a situation where the increasing rate of the vehicular longitudinal acceleration that is detected by the longitudinal acceleration sensor is equal to or larger than a reference value for the increasing rate continues for a period which is equal to or larger than a time reference value for the initiation of calculation.

According to these configurations, the calculation of the integrated value is initiated when a situation where the increasing rate of the vehicular longitudinal acceleration that is detected by the longitudinal acceleration sensor is equal to or larger than a reference value for the increasing rate continues for a period which is equal to or larger than a time reference value for the initiation of calculation. The time reference value for the initiation of calculation may be shorter than, for example, the time which is required for a vehicle to start running after an ignition switch is turned on to initiate the operations of the longitudinal acceleration sensor and the abnormality determination device.

Accordingly, unstable output of the longitudinal acceleration sensor can be prevented from being integrated under an unstable operational situation just after the longitudinal acceleration sensor starts detection. The integration of the longitudinal acceleration can be initiated at a stage of time before a vehicular longitudinal acceleration starts increasing. Therefore, it is possible to reduce the error included in the integrated value of the longitudinal acceleration, i.e. the vehicle speed based on a vehicular longitudinal acceleration, and to thereby reduce the possibility that an erroneous determination is made as to whether or not the longitudinal acceleration sensor is abnormal.

The above-mentioned configuration may be such that: with a value which is equal to or higher than the vehicle speed corresponding to a minimum vehicle wheel speed that can be detected being referred to a vehicle speed reference value for the initiation of determination, when the vehicle speed based on vehicle wheel speeds is lower than the vehicle speed reference value for the initiation of determination, a determination that the longitudinal acceleration sensor is abnormal is not made.

According to the configuration, when the vehicle speed based on vehicle wheel speeds is lower than the vehicle speed reference value for the initiation of determination, the determination that the longitudinal acceleration sensor is abnormal is not made. Accordingly, it is possible to prevent an erroneous determination from being made that the longitudinal acceleration sensor is abnormal due to the cause that the vehicle speed based on vehicle wheel speeds is lower than the vehicle speed reference value for the initiation of determination and the vehicle speed based on vehicle wheel speeds cannot be accurately calculated.

The above-mentioned configuration may be such that: the abnormality determination of the longitudinal acceleration sensor is conducted by determining whether or not the difference between the integrated value and the vehicle speed based on vehicle wheel speeds is larger than a reference value for abnormality determination, and until the vehicle speed based on vehicle wheel speeds becomes equal to or larger than the vehicle speed reference value for the initiation of determination, the reference value for abnormality determination is set to a value which prevents a determination from being made that the longitudinal acceleration sensor is abnormal.

According to the configuration, until the vehicle speed based on vehicle wheel speeds becomes equal to or larger than the vehicle speed reference value for the initiation of determination, i.e. it becomes possible to accurately calculate the vehicle speed based on vehicle wheel speeds, a determination is prevented from being made that the longitudinal acceleration sensor is abnormal. Accordingly, under the situation where the vehicle speed based on vehicle wheel speeds is lower than the vehicle speed reference value for the initiation of determination, it is possible to reliably prevent an erroneous determination from being made that the longitudinal acceleration sensor is abnormal due to the cause that the vehicle speed based on vehicle wheel speeds can not be accurately calculated.

The above-mentioned configuration may be such that: until a time equal to a time reference value for the initiation of determination has passed since the time point when the integrated value starts increasing, a determination is prevented from being made that the longitudinal acceleration sensor is abnormal.

According to the configuration, until a time equal to the time reference value for the initiation of determination has passed since the time point when the integrated value starts increasing, a determination is prevented from being made that the longitudinal acceleration sensor is abnormal. Accordingly, by means of appropriately setting the time reference value for the initiation of determination, under the situation where the vehicle wheel speeds are lower than the minimum vehicle wheel speed that can be detected, it is possible to reduce the possibility that a determination is made that the longitudinal acceleration sensor is abnormal due to the cause that the vehicle speed based on vehicle wheel speeds cannot be accurately calculated.

The above-mentioned configuration may be such that: the abnormality determination of the longitudinal acceleration sensor is conducted by determining whether or not the difference between the integrated value and the vehicle speed based on vehicle wheel speeds is equal to or larger than a reference value for abnormality determination, and until a time equal to the time reference value for the initiation of determination has passed since the time point when the integrated value starts increasing, the reference value for abnormality determination is set to a value which prevents a determination from being made that the longitudinal acceleration sensor is abnormal.

According to the configuration, until the time equal to the time reference value for the initiation of determination has passed since the time point when the integrated value starts increasing, a determination is prevented from being made that the longitudinal acceleration sensor is abnormal. Accordingly, under the situation where the vehicle wheel speeds are lower than the minimum vehicle wheel speed that can be detected, it is possible to reliably prevent an erroneous determination from being made that the longitudinal acceleration sensor is abnormal due to the cause that the vehicle speed based on vehicle wheel speeds cannot be accurately calculated.

The above-mentioned configuration may be such that: a filtering process is conducted with a particular band-pass frequency range on the vehicular longitudinal acceleration that is detected by the longitudinal acceleration sensor, and an integrated value of the filtered vehicular longitudinal acceleration is calculated.

According to the configuration, the influence of low frequency components can be reduced that are generated by temperature drift of the longitudinal acceleration sensor or the inclination of a road surface, and the influence of high frequency components can as well be reduced that are generated by noises. Accordingly, as compared with the case where no filtering process is conducted, the integrated value of the vehicular longitudinal acceleration can be more accurately calculated, which enables to accurately conduct a determination as to whether or not the longitudinal acceleration sensor is abnormal.

The above-mentioned configuration may be such that: the vehicle running control is executed when the vehicle speed based on vehicle wheel speeds is equal to or higher than a vehicle speed reference value for the initiation of the running control, and the vehicle speed reference value for the initiation of the running control is higher than the vehicle speed reference value for the initiation of determination.

According to the configuration, a determination as to whether or not the longitudinal acceleration sensor is abnormal can be conducted before the vehicle running control is initiated. Accordingly, even if an abnormality is caused in the longitudinal acceleration sensor, the longitudinal acceleration detected by the abnormal longitudinal acceleration sensor can be prevented from being used in the vehicle running control, which enables to prevent the vehicle running control from being inappropriately executed.

The above-mentioned configuration may be such that: the calculation of the integrated value and the abnormality determination of the longitudinal acceleration sensor are ended when the vehicle speed based on vehicle wheel speeds becomes equal to or higher than a vehicle speed reference value for the end of determination which is lower than the vehicle speed reference value for the initiation of the running control.

According to the configuration, when the vehicle speed based on vehicle wheel speeds becomes equal to or higher than the vehicle speed reference value for the end of determination which is lower than the vehicle speed reference value for the initiation of the running control, the calculation of the integrated value and the abnormality determination of the longitudinal acceleration sensor are ended. Accordingly, the calculation of the integrated value and the abnormality determination of the longitudinal acceleration sensor can be ended before the vehicle running control is initiated. Therefore, as compared with the case where the calculation of the integrated value and the abnormality determination of the longitudinal acceleration sensor are continued after the vehicle running control has been initiated, the load on the abnormality determination device can be relieved.

The above-mentioned configuration may be such that: the vehicle is a four-wheel drive vehicle, and the vehicle speed based on vehicle wheel speeds is one of an average value of the four vehicle wheel speeds, an average value of three vehicle wheel speeds other than the maximum value among the four vehicle wheel speeds, and an average value of two vehicle wheel speeds other than the maximum and minimum values among the four vehicle wheel speeds.

According to the configuration, the vehicle speed based on vehicle wheel speeds is a vehicle speed based on a plurality of vehicle wheel speeds. Accordingly, as compared with the case where the vehicle speed based on vehicle wheel speeds is a vehicle speed based on a single vehicle wheel speed, the vehicle speed based on vehicle wheel speeds can more accurately be calculated, which enables to determine more accurately whether or not the longitudinal acceleration sensor is abnormal.

The present invention provides a running control device for a vehicle which executes a vehicle running control by means of controlling the driving force of each drive wheel, and stops the vehicle running control when any of drive wheels is determined to be under slip condition on the basis of the vehicle wheel speeds and a vehicular longitudinal acceleration, wherein the running control device has any one of the above-mentioned abnormality determination device for a longitudinal acceleration sensor; the vehicle is a four-wheel drive vehicle; and when the longitudinal acceleration sensor is determined to be abnormal by the abnormality determination device, the vehicle running control is stopped regardless of whether or not any of drive wheels is under slip condition.

The present invention also provides a running control method for a vehicle which executes a vehicle running control by means of controlling the driving force of each drive wheel, and stops the vehicle running control when any of drive wheels is determined to be under slip condition on the basis of the vehicle wheel speeds and a vehicular longitudinal acceleration, wherein any one of the above-mentioned abnormality determination device for a longitudinal acceleration sensor is utilized; the vehicle is a four-wheel drive vehicle; and when the longitudinal acceleration sensor is determined to be abnormal by the abnormality determination device, the vehicle running control is stopped regardless of whether or not any of drive wheels is under slip condition.

According to these configurations, when the longitudinal acceleration sensor is abnormal and it is impossible to accurately determine whether or not any of drive wheels is under slip condition on the basis of vehicle wheel speeds and vehicular longitudinal acceleration, the vehicle running control can be stopped. Accordingly, under a situation where the longitudinal acceleration sensor is determined to be abnormal, the vehicle running control can be prevented from being inappropriately executed.

The above-mentioned configuration may be such that: the vehicle is a four-wheel drive vehicle the mode of which is changed over between four-wheel and two-wheel drive modes, and when the vehicle is in two-wheel drive mode, the abnormality determination device does not conduct the abnormality determination of the longitudinal acceleration sensor.

When a vehicle is in two-wheel drive mode, it is possible to determine whether or not any of drive wheels is under slip condition on the basis of vehicle wheel speeds of non-drive and drive wheels without requiring vehicular longitudinal acceleration, and accordingly, the abnormality determination of the longitudinal acceleration sensor is not required to be conducted. According to the above configuration, when the vehicle is in two-wheel drive mode, the abnormality determination of the longitudinal acceleration sensor is not conducted. Accordingly, the abnormality determination of the longitudinal acceleration sensor can be prevented from being unnecessarily conducted.

The above-mentioned configuration may be such that: when the vehicle is in two-wheel drive mode, the determination as to whether or not any of drive wheels is under slip condition is conducted on the basis of vehicle wheel speeds of non-drive and drive wheels.

When the vehicle is in two-wheel drive mode, vehicle wheel speeds of non-drive wheels correspond to a vehicle body speed. According to the above configuration, it is possible to determine whether or not any of drive wheels is under slip condition on the basis of vehicle wheel speeds of non-drive and drive wheels.

The above-mentioned configuration may be such that: the vehicle running control is an sprung vibration damping control for suppressing resonance of a sprung body caused by acceleration and deceleration of the vehicle.

According to the configuration, when the longitudinal acceleration sensor is abnormal and it is impossible to accurately determine whether or not any of drive wheels is under slip condition on the basis of vehicle wheel speeds and vehicular longitudinal acceleration, the sprung vibration damping control can be stopped. Accordingly, under a situation where the longitudinal acceleration sensor is determined to be abnormal, the sprung vibration damping control can be prevented from being inappropriately executed.

The above-mentioned configuration may be such that: calculation of an integrated value is initiated when a situation where the vehicle speed based on vehicle wheel speeds is zero and the increasing rate of the detected vehicular longitudinal acceleration is equal to or larger than the reference value for the increasing rate continues for a period which is equal to or larger than the time reference value for the initiation of calculation.

The above-mentioned configuration may be such that: abnormality determination of the longitudinal acceleration sensor is conducted when the vehicle speed based on vehicle wheel speeds is higher than the vehicle speed reference value for the initiation of determination.

The above-mentioned configuration may be such that: abnormality determination of the longitudinal acceleration sensor is conducted when a time equal to the time reference value for the initiation of determination has passed since a time point when an integrated value starts increasing.

The above-mentioned configuration may be such that: with a time which is required for the vehicle wheel speeds to increase to a minimum vehicle wheel speed that can be detected from a time point when the integrated value starts increasing being referred to a minimum waiting time, the time reference value for the initiation of determination is set to a value which is equal to or larger than the minimum waiting time.

DESCRIPTION OF EMBODIMENTS

Some preferred embodiments of the present invention will be described in detail with reference to the accompanying drawings.

First Embodiment

Figure 1:
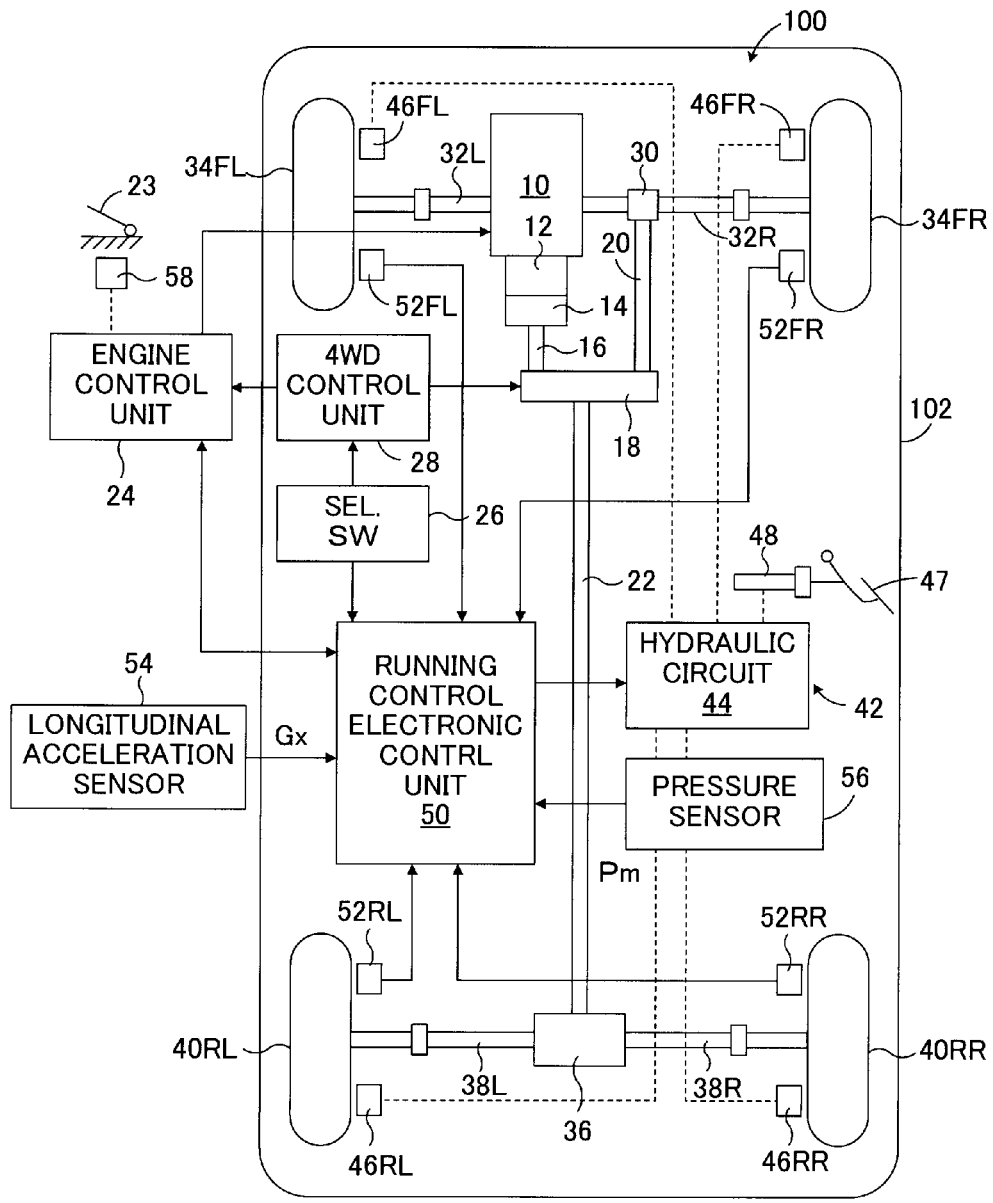
FIG. 1 is a schematic configurational view showing a running control device for a four-wheel drive vehicle to which is applied a first embodiment of an abnormality determination device for a longitudinal acceleration sensor according to the present invention.

FIG. 1 is a schematic configurational view showing a running control device for a four-wheel drive vehicle to which is applied the first embodiment of an abnormality determination device for a longitudinal acceleration sensor according to the present invention.

Referring to FIG. 1, reference numeral 100 denotes a whole of the vehicle running control apparatus equipped in a vehicle 102. Reference numeral 10 denotes an engine, driving force of which is transmitted to an output shaft 16 via a torque converter 12 and a transmission 14. The driving force is in turn transmitted from the output shaft 16 to a front-wheel propeller shaft 20 and/or a rear-wheel propeller shaft 22 via a transfer 18 which serves as a driving-state switching means. The output of the engine 10 is controlled by an engine control unit 24 in accordance with an amount of depression of an accelerator pedal 23 operated by a vehicle driver, and so on.

The transfer 18 includes an actuator, not shown, that switches the driving state of the vehicle between four-wheel drive (4WD) and two-wheel drive (2WD) states. The actuator is controlled by a 4WD control unit 28 in response to an operated position of a selection switch (SW) 26 which is operated by the driver. The selection switch 26 is selectively operated to either of H4, H2, N and L4 positions.

When the selection switch 26 is in H4 position, the transfer 18 is set in a 4WD position for transmitting the driving force of the output shaft 16 to both the front-wheel propeller shaft 20 and the rear-wheel propeller shaft 22. When the selection switch 26 is in H2 position, the transfer 18 is set in a 2WD position for transmitting the driving force of the output shaft 16 only to the rear-wheel propeller shaft 22. When the selection switch 26 is in N position, the transfer 18 is set in a position for transmitting the driving force of the output shaft 16 to none of the front-wheel propeller shaft 20 and the rear-wheel propeller shaft 22. Furthermore, when the selection switch 26 is in L4 position, the transfer 18 is set in a 4WD position for transmitting the driving force of the output shaft 16 to both the front-wheel propeller shaft 20 and the rear-wheel propeller shaft 22 as driving force for lower vehicle speed and higher torque situation as compared with the H4 position.

As shown in FIG. 1, the 4WD control unit 28 supplies the engine control unit 24 with a signal indicating whether the 4WD control unit 28 has commanded the transfer 18 to be placed in the 2WD or 4WD position, based on a command signal received from the selection switch 26. In accordance with the position of the transfer 18 commanded by the 4WD control unit 28, the engine control unit 24 controls the output of the engine 10.

The driving force of the front-wheel propeller shaft 20 is transmitted to a front-left axle 32L and a front-right axle 32R via a front-wheel differential 30 so as to rotationally drive a front-left wheel 34FL and a front-right wheel 34FR. Likewise, the driving force of the rear-wheel propeller shaft 22 is transmitted to a rear-left axle 38L and a rear-right axle 38R via a rear-wheel differential 36 so as to rotationally drive a rear-left wheel 40RL and a rear-right wheel 40RR.

Braking forces applied to the front-left, front-right, rear-left and rear-right wheels 34FL, 34FR, 40RL and 40RR, respectively, are controlled by means of braking pressures in wheel cylinders 46FL, 46FR, 46RL and 46RR corresponding thereto being controlled by a hydraulic circuit 44 of a braking unit 42. Although not shown, the hydraulic circuit 44 includes a reservoir, an oil pump, various valve devices, and so on. The braking pressure in each of the wheel cylinders is normally controlled by a master cylinder 48 that is driven in accordance with an operation of a brake pedal 47 by the vehicle driver. When appropriate, the braking pressure is controlled by a running control electronic control unit 50 as will be described later in detail.

The electronic control unit 50 receives signals indicative of wheel speeds Vi (i=fl, fr, rl and rr) of the front-left, front-right, rear-left and rear-right wheels from respective wheel speed sensors 52FL, 52FR, 52RL and 52RR. The electronic control unit 50 also receives a signal indicative of a longitudinal acceleration Gx of the vehicle from a longitudinal acceleration sensor 54 and a signal indicative of the position of the transfer 18 from the selection switch 26. The longitudinal acceleration sensor 54 detects a longitudinal acceleration Gx, which assumes a positive value when it is in the vehicle accelerating direction. The electronic control unit 50 further receives a signal indicative of a master cylinder pressure Pm which is the pressure in the master cylinder 48 from a pressure sensor 56.

The engine control unit 24 receives signals indicative of an accelerator opening Acc from an accelerator opening sensor 58 provided at the accelerator pedal 23. It is to be noted that the engine control unit 24, the 4WD control unit 28, and the electronic control unit 50 may each be actually constituted by a microcomputer including, for example, a CPU, a ROM, a RAM, and I/O devices, and a driving circuit or circuits.

As will be described later in detail, the electronic control unit 50 executes an sprung vibration damping control for suppressing resonance of an sprung body caused by acceleration and deceleration of the vehicle as a vehicle running control when the vehicle speed V is equal to or higher than a reference value Vdcs for executing the control (a positive constant). The sprung vibration damping control is executed by means of the control in a sprung vibration damping controller 56 shown in FIG. 2 being achieved by the electronic control unit 50.

Figure 2:
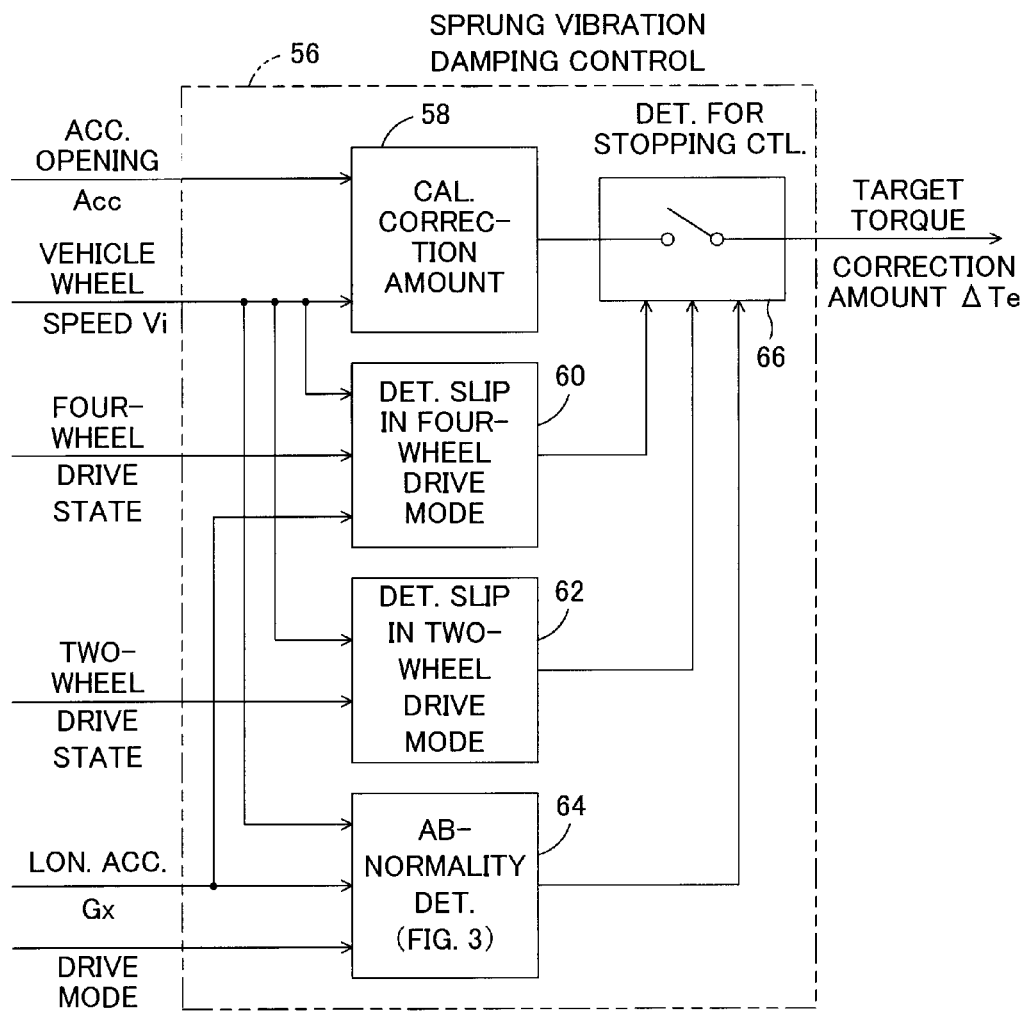
FIG. 2 is a block diagram showing a sprung vibration damping control for suppressing resonance of a sprung member as a running control for a vehicle.

As illustrated in FIG. 2, the sprung vibration damping controller 56 has a block 58 for calculating a correction amount, a block 60 for determining a slip in four-wheel drive mode, a block 62 for determining a slip in two-wheel drive mode, a block 64 for determining abnormality, and a block 66 for judging stopping the control. The sprung vibration damping controller 56 calculates a target torque correction amount ΔTe of the engine 10 for suppressing resonance of the sprung body caused by acceleration and deceleration of the vehicle, and outputs a signal indicative of the target torque correction amount ΔTe to the engine control unit 24.

The block 58 for calculating correction amount calculates a vehicle speed V based on the vehicle wheel speeds Vi. In addition, the block 58, when the vehicle speed V is equal to or higher than the reference value Vdcs, calculates a target torque correction amount ΔTe on the basis of the accelerator opening Acc and the vehicle wheel speeds Vi, and outputs a signal indicative of the target torque correction amount ΔTe to the block 66 for judging stopping the control.

It is to be noted that the calculation of the target torque correction amount ΔTe does not constitute an important part of the present invention, and may be conducted in such a manner as described, for example, in Japanese Patent Application Laid-Open No. 2010-106817. That is, a feed-forward correction amount ΔTeff may be calculated on the basis of the accelerator opening Acc; a feed-back correction amount ΔTefb may be calculated on the basis of the vehicle wheel speeds Vi; and a target torque correction amount ΔTe may be calculated on the basis of the correction amounts ΔTeff and ΔTefb.

The engine control unit 24 calculates a target torque Tet on the basis of the accelerator opening Acc and the like. When the engine control unit 24 does not receive a signal indicative of the target torque correction amount ΔTe, it controls the output torque of the engine 10 in accordance with the target torque Tet. While on the other hand, when the engine control unit 24 receives a signal indicative of the target torque correction amount ΔTe, it controls the output torque of the engine 10 in accordance with a post-correction target torque Teta which is a target torque Tet of the engine 10 corrected by the target torque correction amount ΔTe.

When the vehicle is in the four-wheel drive mode and is not under braking, a signal indicating that the vehicle is in the four-wheel drive state is input from the 4WD control unit 28 to the block 60 for determining a slip in four-wheel drive mode. The block 60 calculates an estimated vehicle body speed Vb on the basis of the four vehicle wheel speeds Vi and the longitudinal acceleration Gx of the vehicle. In addition, the block 60 decides whether or not a drive slip is generated in any of the drive wheels on the basis of the four vehicle wheel speeds Vi and the estimated vehicle body speed Vb, and outputs a signal indicating the decision to the block 66 for judging stopping the control.

It is to be noted that the decision of the drive slip in the four-wheel drive mode while the vehicle is not under braking does not constitute an important part of the present invention, and may be conducted in such a manner as described, for example, in Japanese Patent Application Laid-Open No. 2011-37338. That is, a first estimated vehicle body speed Vb1 may be calculated on the basis of the lowest vehicle wheel speed Vmin among the four vehicle wheel speeds Vi. With an estimated vehicle body speed just before being represented by Vbf and the interval between estimations being represented by Δt, a second estimated vehicle body speed Vb2 may be calculated according to Vbf+Gx*Δt. An estimated vehicle body speed Vb may be calculated on the basis of the first and second estimated vehicle body speeds Vb1 and Vb2.

The decision as to whether or not the vehicle is not under braking may be conducted by a decision as to whether or not braking forces are applied to the vehicle wheels on the basis of the master cylinder pressure Pm. When the drive state is the four-wheel drive state but the vehicle is under braking, the block 60 for determining a slip does not conduct the decision as to whether or not a drive slip is generated.

By contrast, when the vehicle is in two-wheel drive state and is not under braking, a signal indicating that the vehicle is in two-wheel drive state is input from the 4WD control unit 28 to the block 62 for determining a slip in two-wheel drive mode. The block 62 calculates an estimated vehicle body speed Vb on the basis of the speeds Vi of the driven vehicle wheels, and calculates drive slip amounts or drive slip ratios of the drive wheels on the basis of the speeds Vi of the driven vehicle wheels and the estimated vehicle body speed Vb. In addition, the block 62 decides whether or not the drive slip amount or the drive slip ratio is equal to or higher than a reference value to determine whether or not a drive slip is generated in any of the drive wheels, and outputs a signal indicative of the determination to the block 66 for judging stopping the control.

As will be described in detail herein later, the block 64 for determining abnormality decides whether or not the longitudinal acceleration sensor 54 is abnormal on the basis of the vehicle wheel speeds Vi and the vehicular longitudinal acceleration Gx in accordance with the routine for conducting abnormality determination of a longitudinal acceleration sensor shown in FIG. 3.

When no one of the following (a1) to (a3) is satisfied, the block 66 for judging stopping the control permits for the signal indicative of the target torque correction amount ΔTe to be output to the engine control unit 24. While on the other hand, when any one of the following (a1) to (a3) is satisfied, the block 66 for judging stopping the control inhibits the signal indicative of the target torque correction amount ΔTe from being output to the engine control unit 24 to thereby stop the sprung vibration damping control.

(a1) In the four-wheel drive state, the block 60 for determining a slip has decided that a drive slip is generated in at least one of the vehicle wheels.

(a2) In the two-wheel drive state, the block 62 for determining a slip has decided that a drive slip is generated in at least one of the drive wheels.

(a3) In the four-wheel drive state, the block 64 for determining abnormality has decided that the longitudinal acceleration sensor 54 is abnormal.

Next, the routine for conducting abnormality determination of a longitudinal acceleration sensor in the first embodiment will be described with reference to the flowchart shown in FIG. 3. The control process according to the flowchart shown in FIG. 3 is initiated upon a closing (ON) of an ignition switch (not shown) and is performed repeatedly at predetermined time intervals.

First, in step 10, a decision is made as to whether or not a flag F is 1, that is, whether or not the decision has been made that a start condition has been satisfied which allows to calculate an integrated value Vx of the vehicular longitudinal acceleration Gx. If an affirmative decision is made, the control proceeds to step 40, whereas if a negative decision is made, the control proceeds to step 20.

In step 20, a decision is made as to whether or not a calculation starting condition has been satisfied which allows to calculate an integrated value Vx of the vehicular longitudinal acceleration Gx. If a negative decision is made, the control returns to step 10, whereas if an affirmative decision is made, in step 30 the flag F is set to 1 and, subsequently, the control proceeds to step 60.

Notably, a calculation starting condition which allows to calculate an integrated value Vx may be judged to be satisfied when the following (b1) and (b2) are satisfied. In the following (b2), the condition "All the vehicle wheel speeds Vi are 0" may be omitted.

(b1) The vehicle is not under braking.

(b2) All the vehicle wheel speeds Vi are 0 and a situation where the increasing rate Rgx of the vehicular longitudinal acceleration Gx is equal to or smaller than a reference value of increasing rate Rgxo (a positive constant) continues for a period which is equal to or larger than a reference value for initiating calculation Tgcs (a positive constant).

In step 40, a vehicle speed V is set to a minimum value Vmin among the four vehicle wheel speeds Vi when the vehicle is under acceleration and is set to a maximum value Vmax among the four vehicle wheel speeds Vi when the vehicle is under deceleration.

In step 50, a decision is made as to whether or not an end condition has been satisfied which allows to end calculation of an integrated value Vx of the vehicular longitudinal acceleration Gx and abnormality determination of a longitudinal acceleration sensor 54. If an affirmative decision is made, the control proceeds to step 70, whereas if a negative decision is made, the control proceeds to step 60.

Notably, an end condition which allows to end calculation of an integrated value Vx may be judged to be satisfied when the following (c1) and (c2) are satisfied.

(c1) The vehicle is under braking.

(c2) The vehicle speed V is equal to or higher than an end reference value Ve (a positive constant which is lower than the reference value Vdcs for executing the sprung vibration damping control).

In step 60, a decision is made as to whether or not the vehicle is under four-wheel drive mode on the basis of the signal indicative of drive mode input from the four-wheel drive control unit 28. If an affirmative decision is made, the control proceeds to step 80, whereas if a negative decision is made, in step 70, the flag F is reset to 0 and the calculation of an integrated value Vx of the vehicular longitudinal acceleration Gx and abnormality determination of a longitudinal acceleration sensor 54 are ended.

In step 80, a band-pass filtering process is conducted on the vehicular longitudinal acceleration Gx and an integrated value Vx of the filtered vehicular longitudinal acceleration Gx is calculated as a vehicle speed. It is to be noted that the pass band of the band-pass filtering process is set to a range which removes both a low frequency components that are caused by temperature drift or the inclination of road surface and a high frequency components that are caused by noises, but allows for any longitudinal acceleration in a frequency range caused by acceleration and deceleration of the vehicle to pass.

In step 90, the vehicle speed Vw based on vehicle wheel speeds Vi is calculated to an average of the higher vehicle wheel speed Vmedh and the lower vehicle wheel speed Vmedl which are two of the four vehicle wheel speeds Vi other than the maximum vehicle wheel speed Vmax and the minimum vehicle wheel speed Vmin.

In step 100, a decision is made as to whether or not the vehicle speed Vw is equal to or higher than a reference value Vws for starting abnormality determination of the longitudinal acceleration sensor (a positive constant). If an affirmative decision is made, the control proceeds to step 150, whereas if a negative decision is made, the control according to the flow chart shown in FIG. 3 is ended. It is to be noted that the reference value Vws for starting abnormality determination is equal to or higher than a vehicle speed Vwo which corresponds to a minimum vehicle wheel speed that can be detected by the vehicle wheel speed sensors 52FL-52RR.

In step 150, a decision is made as to whether or not the absolute value of the difference between the integrated value Vx of the longitudinal acceleration Gx and the vehicle speed Vw based on the vehicle wheel speeds Vi is equal to or higher than a reference value ΔVs for determining abnormality (a positive constant). If a negative decision is made, in step 160 the longitudinal acceleration sensor 54 is judged to be normal, whereas if an affirmative decision is made, in step 170 the longitudinal acceleration sensor 54 is judged to be abnormal.

As is understood from the above descriptions, when the starting conditions (b1) and (b2) which allows to calculate an integrated value Vx of the longitudinal acceleration Gx are satisfied, an affirmative decision is made in step 20. As long as the drive state is the four-wheel drive state, the step 80 and the following steps are conducted until the end conditions (c1) and (c2) are satisfied and an affirmative decision is made in step 50.

When the vehicle speed Vw becomes equal to or higher than the reference value Vws for starting abnormality determination of the longitudinal acceleration sensor, an affirmative decision is made in step 100, and in steps 150-170 a decision is made as to whether or not the longitudinal acceleration sensor 54 is abnormal. That is, a decision is made as to whether or not the absolute value of the difference between the integrated value Vx of the longitudinal acceleration Gx and the vehicle speed Vw based on the vehicle wheel speeds Vi is equal to or higher than the reference value ΔVs for determining abnormality to determine whether or not the longitudinal acceleration sensor 54 is abnormal.

Figure 7:
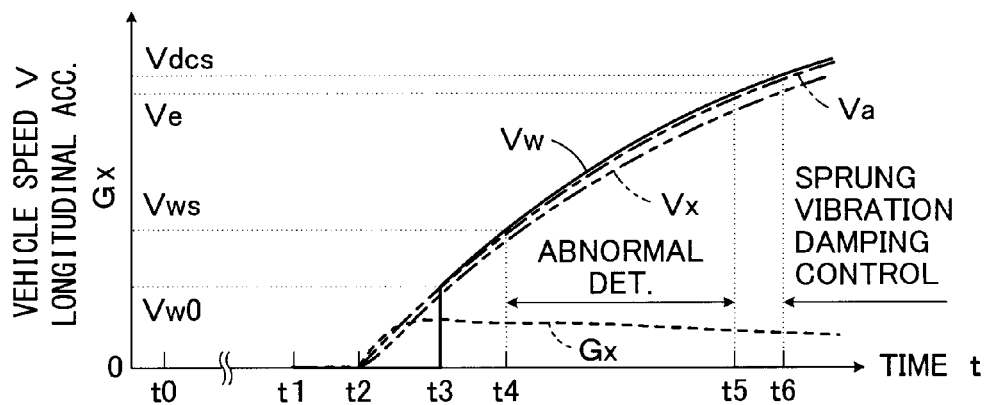
FIG. 7 is a graph showing examples of the changes in the vehicle speed Vw based on vehicle wheel speeds Vwi, the actual vehicle speed Va, the vehicular longitudinal acceleration Gx and the integrated value Vx of the longitudinal acceleration Gx when a vehicle starts running in four-wheel drive mode.

FIG. 7 is a graph showing examples of the changes in the vehicle speed Vw (solid line) based on vehicle wheel speeds Vwi, the actual vehicle speed Va (chain line), the vehicular longitudinal acceleration Gx (broken line) and the integrated value Vx (two-dot chain line) of the longitudinal acceleration Gx when a vehicle starts running in four-wheel drive mode.

Figure 3:
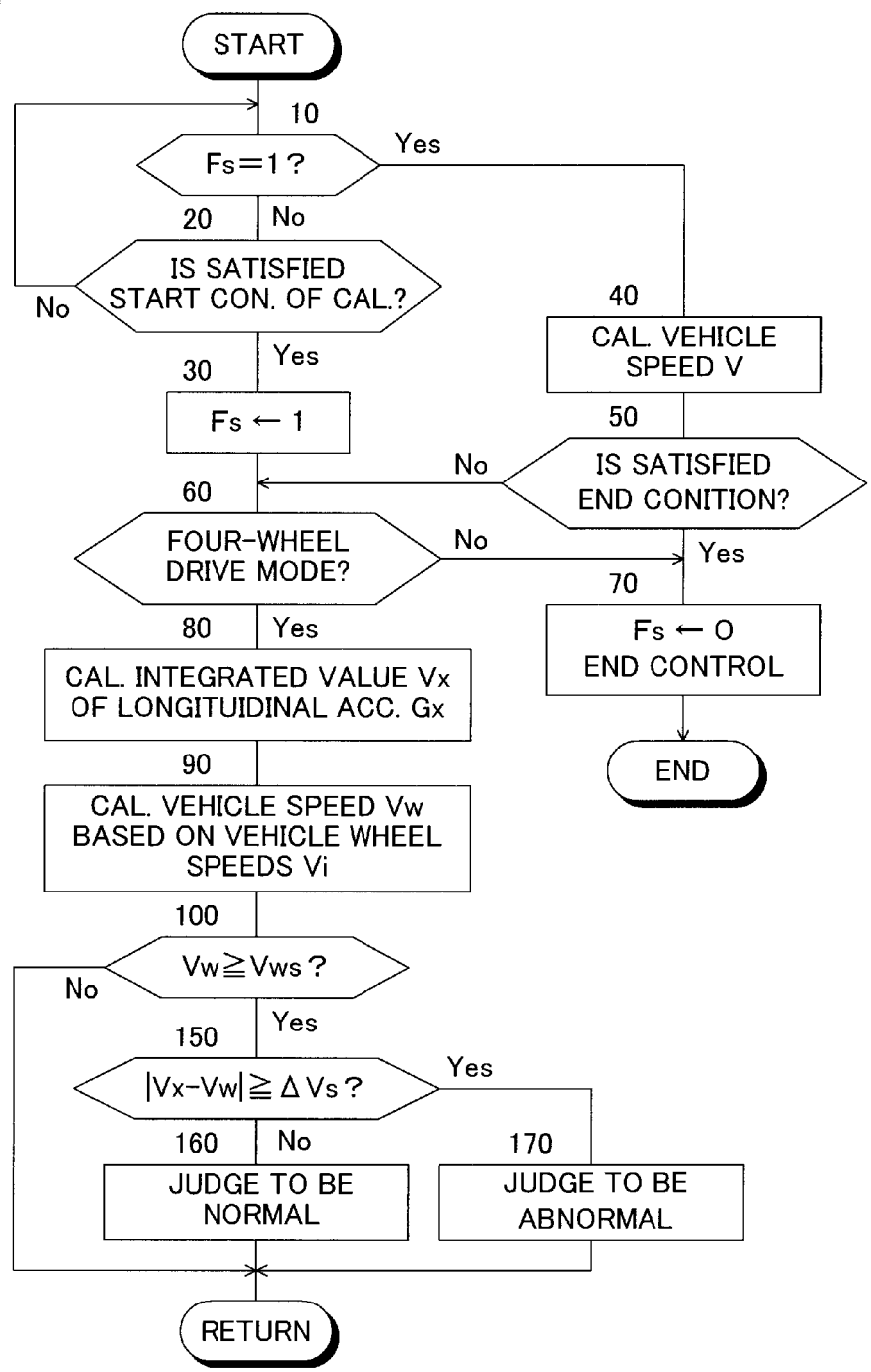
FIG. 3 is a flowchart showing a routine for conducting abnormality determination of a longitudinal acceleration sensor in the first embodiment.

As illustrated in FIG. 7, it is assumed that at a time point t0, the ignition switch is turned on and the control in accordance with the flowchart shown in FIG. 3 is initiated. It is also assumed that at a time point t1, all the vehicle wheel speeds Vi are 0, and the state where the increasing rate Rgx of the vehicular longitudinal acceleration Gx is equal to or smaller than the reference value of increasing rate Rgxo continues for a period which is equal to or larger than the reference value for initiating calculation Tgcs, resulting in affirmative decisions being made in steps 20 and 60.

Under the above-mentioned situation, at the time point t1, calculation of an integrated value Vx of the vehicular longitudinal acceleration Gx in step 80 and calculation of a vehicle speed Vw based on vehicle wheel speeds Vi in step 90 are initiated. Assume that at the time point t2, the vehicle starts running, the actual vehicle speed Va and the vehicular longitudinal acceleration Gx begin to increase at the time point t2, and the integrated value Vx of the vehicular longitudinal acceleration Gx starts increasing at a time point which is slightly later than the time point t2.

However, since the wheel speed sensors 52FL-52RR cannot detect the wheel speeds when the actual wheel speeds are very low, the vehicle speed Vw based on vehicle wheel speeds Vi becomes 0 when the actual wheel speeds are very low. Assume that at a time point t3, the actual wheel speeds have increased to a value which can be detected by the wheel speed sensors 52FL-52RR, the vehicle speed Vw based on vehicle wheel speeds Vi instantly increases from 0 to Vw0 at this time point. It is also assumed that the vehicle speed Vw based on vehicle wheel speeds Vi continues to increase since then, becomes equal to or larger than the reference value Vws for starting abnormality determination of the longitudinal acceleration sensor at a time point t4, and reaches a value equal to or larger than the end reference value Ve at a time point t5.

Before the time point t4, an integrated value Vx of the vehicular longitudinal acceleration Gx and a vehicle speed Vw based on vehicle wheel speeds Vi are calculated but the abnormality determination of the longitudinal acceleration sensor is not conducted. The abnormality determination of the longitudinal acceleration sensor is started at the time point t4 and is finished at the time point t5. It is to be understood that assuming the vehicle speed Vw becomes equal to or larger than the reference value Vdcs for executing the sprung vibration damping control at a time point t6, the sprung vibration damping control is started at this time point.

Thus, according to the first embodiment, when all the vehicle wheel speeds Vi are 0, and the state where the increasing rate Rgx of the vehicular longitudinal acceleration Gx is equal to or smaller than the reference value of increasing rate Rgxo continues for a period which is equal to or larger than the reference value Tgcs for initiating calculation, calculation of an integrated value Vx of the vehicular longitudinal acceleration Gx is initiated. Accordingly, it is possible to exclude the influence of the values which are detected under a situation where the output of the longitudinal acceleration sensor 54 is unstable just after the sensor started detection.

If calculation of an integrated value Vx of the vehicular longitudinal acceleration Gx is initiated at the time point t3 when the vehicle speeds can be detected by the wheel speed sensors 52FL-52RR, the longitudinal acceleration Gx from the time point t2 to the time point t3 are not integrated. Accordingly, for the reason that an integrated value Vx of the longitudinal acceleration Gx cannot be appropriately calculated, the abnormality determination of the longitudinal acceleration sensor 54 may be inappropriately conducted in step 150.

According to the first embodiment, in contrast, calculation of an integrated value Vx of the vehicular longitudinal acceleration Gx is initiated at the time point t1 when all the vehicle speeds Vi are 0, which ensures that the longitudinal accelerations Gx is integrated from the time point t2 when the longitudinal acceleration Gx starts increasing to the time point t3. Accordingly, the abnormality determination can be prevented from being inappropriately conducted in step 150 due to inappropriate calculation of an integrated value Vx of the vehicular longitudinal acceleration Gx. It is to be noted that this effect can as well be achieved in the other embodiments described later.

According to the first embodiment, under the situation where the vehicle speed Vw is equal to or higher than the reference value Vws for starting abnormality determination of the longitudinal acceleration sensor which is equal to or larger than Vw0, the decision as to whether or not the longitudinal acceleration sensor 54 is abnormal is conducted in steps 150-170. Accordingly, the decision as to whether or not the longitudinal acceleration sensor 54 is abnormal can be prevented from being conducted under the situation where the actual vehicle wheel speeds are too low for the wheel speed sensors 52FL-52RR to detect the vehicle wheel speeds. In other words, an erroneous judgment can be prevented from being made that the longitudinal acceleration sensor 54 is abnormal due to the cause that the wheel speed sensors 52FL-52RR can not detect the vehicle wheel speeds in spite that the sensor 54 is actually normal.

According to the first embodiment, when the vehicle speed Vw is lower than the reference value Vws for starting abnormality determination of the longitudinal acceleration sensor, the abnormality determination of the longitudinal acceleration sensor is not conducted. Accordingly, as compared with the third embodiment described later, the number of conducting step 150, i.e. conduction number of abnormality determination of the longitudinal acceleration sensor can be reduced.

It is to be noted that the control may be modified so that the decision in step 100, i.e. the decision as to whether or not the vehicle speed Vw is equal to or higher than the reference value Vws for starting abnormality determination of the longitudinal acceleration sensor is conducted prior to step 80, and if an affirmative decision is made, the control proceeds to 80.

It is also to be noted that the control may be modified so that the decision in step 100 is not conducted prior to step 150 but is conducted prior to step 170. In the modification, if an affirmative decision is made in step 100, the control proceeds to 170, whereas if a negative decision is made, the control proceeds to 160.

Second Embodiment

Figure 4:
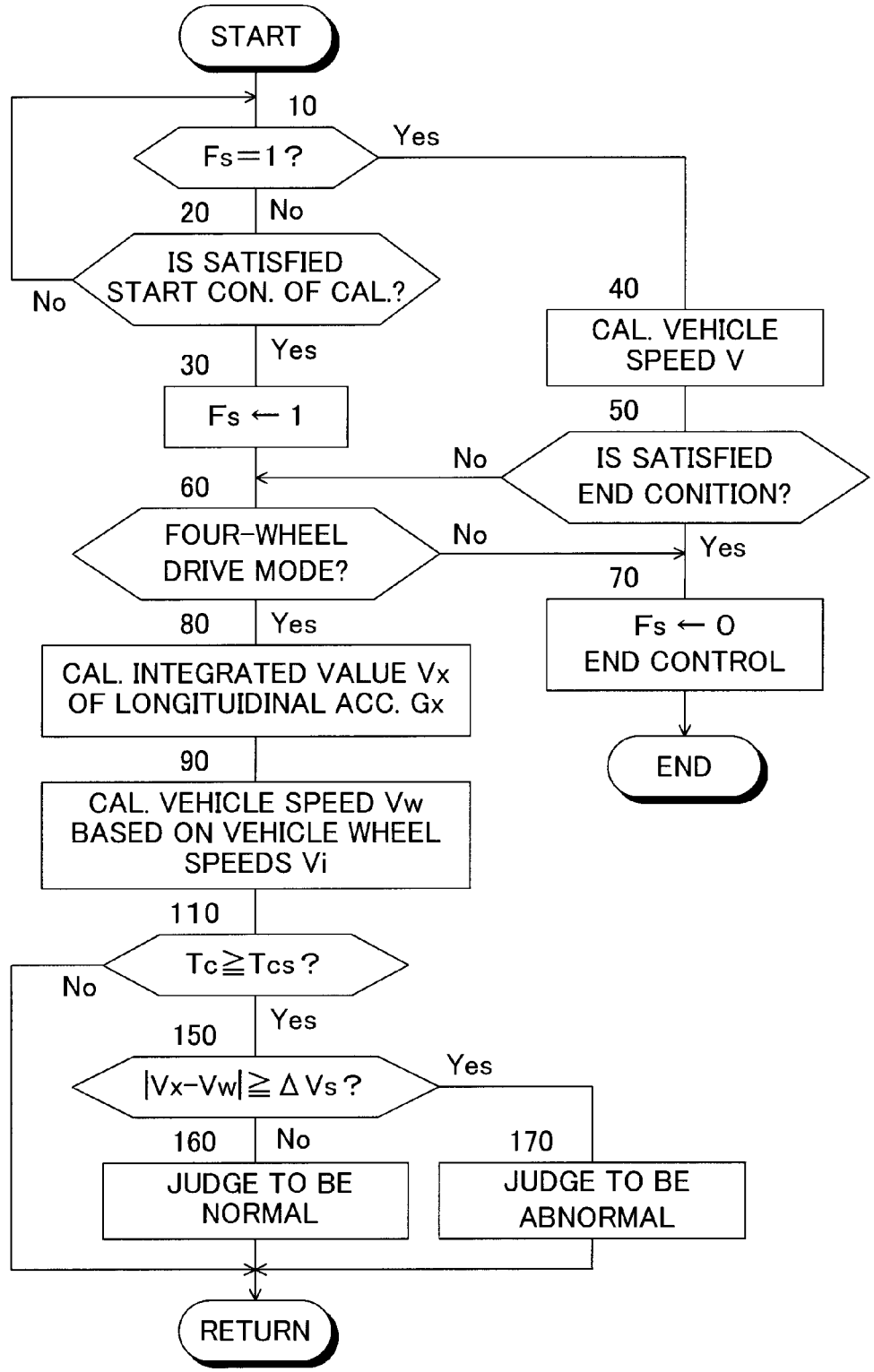
FIG. 4 is a flowchart showing a routine for conducting abnormality determination of a longitudinal acceleration sensor in the second embodiment of the abnormality determination device for a longitudinal acceleration sensor according to the present invention.

FIG. 4 is a flowchart showing a routine for conducting abnormality determination of a longitudinal acceleration sensor in the second embodiment of the abnormality determination device for a longitudinal acceleration sensor according to the present invention. In FIG. 4, the same steps as those shown in FIG. 3 are denoted by the same step numbers as in FIG. 3. The same goes for FIGS. 5 and 6 referred to later.

In the present second embodiment, step 100 is not conducted and after completion of step 90, the control proceeds to step 110.

In step 110, a decision as to whether or not an elapsed time Tc since a time point when the integrated value Vx of the longitudinal acceleration Gx starts increasing is equal to or larger than a reference value Tcs for starting determination (a positive constant). If an affirmative decision is made, the control proceeds to step 150, whereas if a negative decision is made, the control according to the flow chart shown in FIG. 4 is ended. Steps 150-170 are conducted in the same manner as in the first embodiment.

Figure 8:
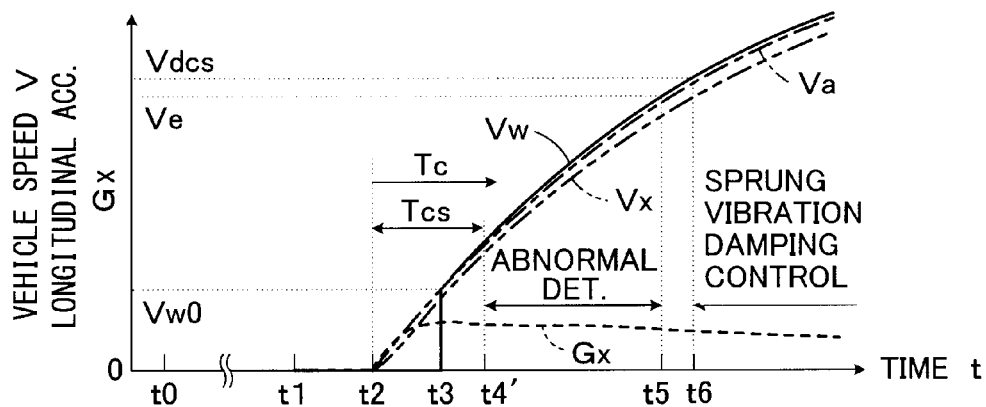
FIG. 8 is a graph showing the other examples of the changes in the vehicle speed Vw based on vehicle wheel speeds Vwi, the actual vehicle speed Va, the vehicular longitudinal acceleration Gx and the integrated value Vx of the longitudinal acceleration Gx when a vehicle starts running in four-wheel drive mode.

As is understood from comparing FIGS. 7 and 8 with each other, when the increasing rate of the vehicle speed is high, the period of time from a time point when the integrated value Vx of the longitudinal acceleration Gx starts increasing to a time point when the wheel speed sensors can detect the vehicle wheel speeds is shortened as compared to where the increasing rate of the vehicle speed is low. That is, the Interval of times between the time points t2 and t3 decreases as the magnitude of the longitudinal acceleration Gx increases.

The reference value Tcs for starting determination is variably set in accordance with the magnitude of the longitudinal acceleration Gx or the increasing rate of the integrated value Vx of the longitudinal acceleration Gx so that the reference value decreases as the magnitude of the longitudinal acceleration Gx or the increasing rate of the integrated value Vx increases. As shown in FIG. 8, the elapsed time Tc since a time point when the integrated value Vx of the longitudinal acceleration Gx starts increasing is assumed to be equal to the reference value Tcs for starting determination at a time point t4'. The reference value Tcs for starting determination is set so that the time point t4' is later than t3.

Therefore, according to the second embodiment, the decision as to whether or not the longitudinal acceleration sensor 54 is abnormal is conducted under the situation where the elapsed time Tc since a time point when the integrated value Vx of the longitudinal acceleration Gx starts increasing is equal to or larger than the reference value Tcs for starting determination. Accordingly, similarly to the first embodiment, an erroneous judgment can be prevented from being made that the longitudinal acceleration sensor 54 is abnormal due to the cause that the actual vehicle wheel speeds are too low for the wheel speed sensors to detect the vehicle wheel speeds in spite that the sensor 54 is actually normal.

Thus, according to the second embodiment, when the elapsed time Tc since a time point when the integrated value Vx of the longitudinal acceleration Gx starts increasing is smaller than the reference value Tcs for starting determination, the abnormality determination of the longitudinal acceleration sensor is not conducted. Accordingly, as compared with a fourth embodiment described later, the number of conducting step 150, i.e. conduction number of abnormality determination of the longitudinal acceleration sensor can be reduced.

It is to be noted that the control may be modified so that the decision in step 110, i.e. the decision as to whether or not the elapsed time Tc is equal to or higher than the reference value Tcs for starting determination is conducted prior to step 80, and if an affirmative decision is made, the control proceeds to 80.

It is also to be noted that the control may be modified so that the decision in step 110 is not conducted prior to step 150 but is conducted prior to step 170. In the modification, if an affirmative decision is made in step 110, the control proceeds to 170, whereas if a negative decision is made, the control proceeds to 160.

Third Embodiment

Figure 5:
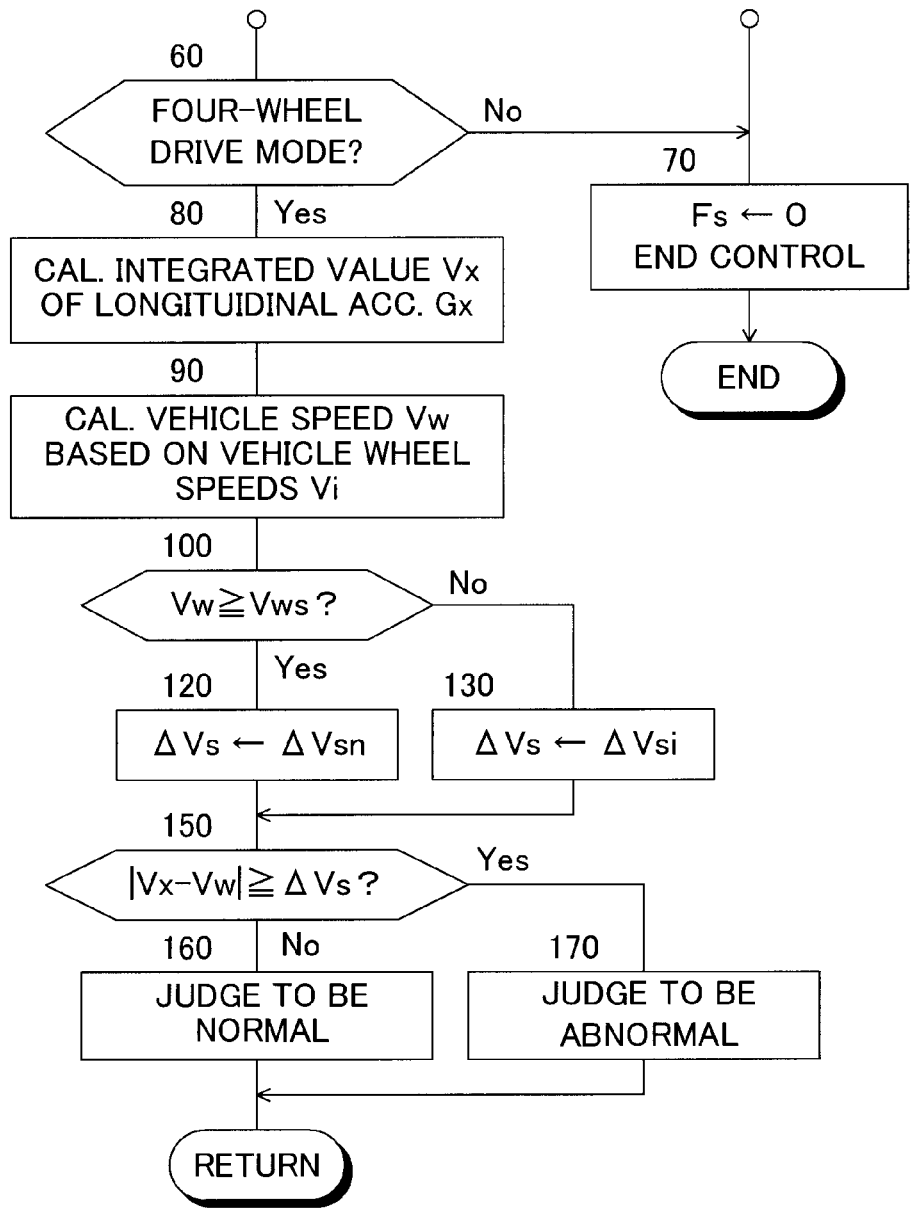
FIG. 5 is a flowchart showing a routine for conducting abnormality determination of a longitudinal acceleration sensor in the third embodiment of the abnormality determination device for a longitudinal acceleration sensor according to the present invention which is configured as a modification of the first embodiment.

FIG. 5 is a flowchart showing a routine for conducting abnormality determination of a longitudinal acceleration sensor in the third embodiment of the abnormality determination device for a longitudinal acceleration sensor according to the present invention.

In the present third embodiment, when an affirmative decision is made in step 100, in step 120 the reference value ΔVs for determining abnormality used in step 150 is set to a standard value ΔVsn (a positive constant). By contrast, when a negative decision is made in step 100, in step 130 the reference value ΔVs for determining abnormality is set to a value ΔVsi (a positive constant) which is larger than the standard value ΔVsn and prevents the decision from being made that the longitudinal acceleration sensor 54 is abnormal. Steps 150-170 are conducted in the same manner as in the first embodiment.

Thus, according to the third embodiment, even when the vehicle speed Vw is lower than the reference value Vws for starting abnormality determination of the longitudinal acceleration sensor, the abnormality determination of the longitudinal acceleration sensor is conducted but the decision is prevented from being made that the longitudinal acceleration sensor 54 is abnormal. Accordingly, similarly to the first and second embodiments, an erroneous judgment can be prevented from being made that the longitudinal acceleration sensor 54 is abnormal due to the cause that the actual vehicle wheel speeds are too low for the wheel speed sensors to detect the vehicle wheel speeds in spite that the sensor 54 is actually normal.

It is to be noted that since steps 100, 120 and 130 only have to be conducted prior to step 150, the control may be modified so that the steps 100, 120 and 130 are conducted prior to step 80, or 90.

Fourth Embodiment

Figure 6:
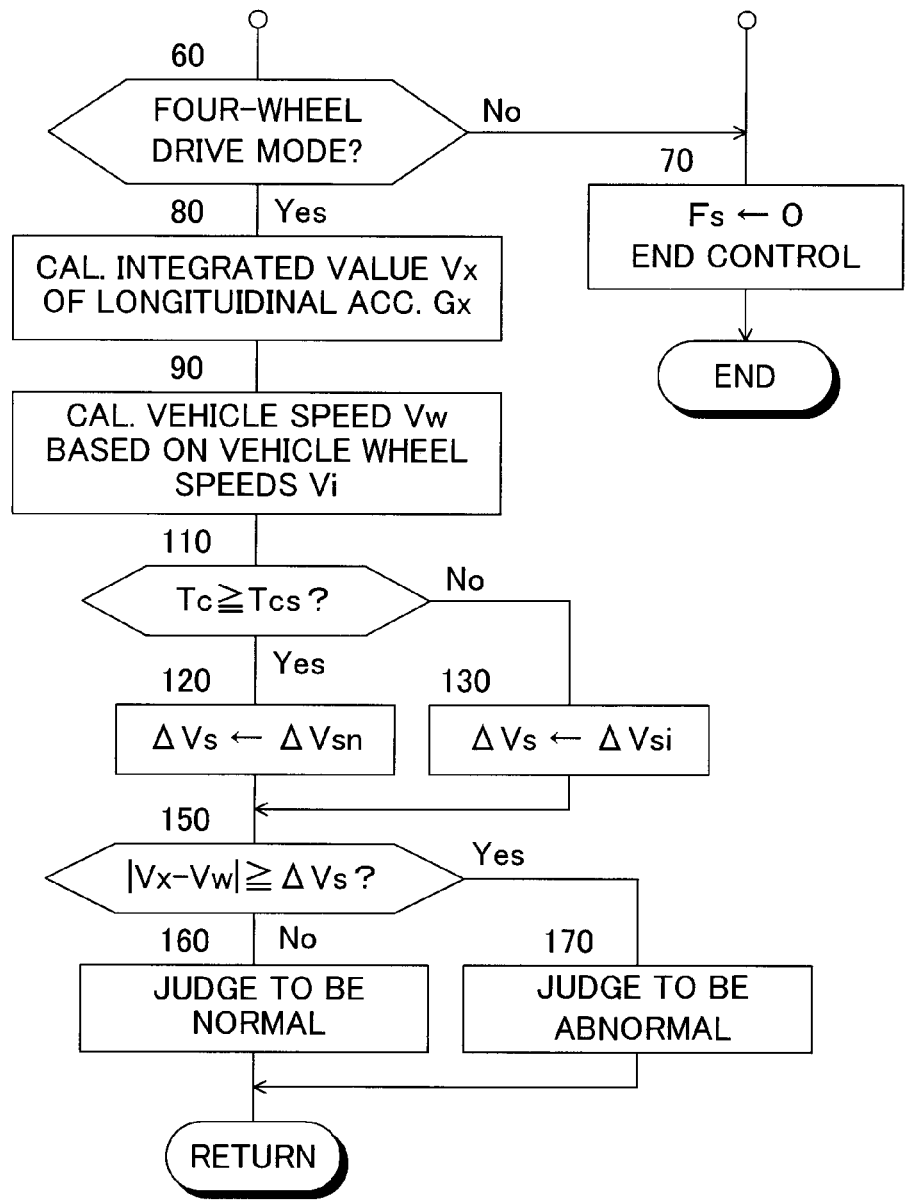
FIG. 6 is a flowchart showing a routine for conducting abnormality determination of a longitudinal acceleration sensor in the fourth embodiment of the abnormality determination device for a longitudinal acceleration sensor according to the present invention which is configured as a modification of the second embodiment.

FIG. 6 is a flowchart showing a routine for conducting abnormality determination of a longitudinal acceleration sensor in the fourth embodiment of the abnormality determination device for a longitudinal acceleration sensor according to the present invention which is configured as a modification of the second embodiment.

In the present fourth embodiment, after completion of step 90, the control proceeds to step 110. If an affirmative decision is made, the control proceeds to step 120, whereas if a negative decision is made, the control proceeds to step 130. Steps 150-170 are conducted in the same manner as in the first embodiment.

Thus, according to the fourth embodiment, even when the elapsed time Tc is lower than the reference value Tcs for starting determination, the abnormality determination of the longitudinal acceleration sensor is conducted but the decision is prevented from being made that the longitudinal acceleration sensor 54 is abnormal. Accordingly, similarly to the first to third embodiments, an erroneous judgment can be prevented from being made that the longitudinal acceleration sensor 54 is abnormal due to the cause that the actual vehicle wheel speeds are too low for the wheel speed sensors to detect the vehicle wheel speeds in spite that the sensor 54 is actually normal.

It is to be noted that since steps 100-130 only have to be conducted prior to step 150, the control may be modified so that the steps 100-130 are conducted prior to step 80 or 90.

According to the above-described embodiments, in step 80, a band-pass filtering process is conducted on the vehicular longitudinal acceleration Gx and the integrated value Vx of the vehicular longitudinal acceleration Gx is calculated as a vehicle speed. Accordingly, as compared to where a band-pass filtering process is not conducted on the vehicular longitudinal acceleration Gx, reductions can be done in the influence of low frequency components that are caused by temperature drift of the longitudinal acceleration sensor or the inclination of road surface, and the influence of high frequency components that are caused by noises, which enables to accurately calculate an integrated value Vx of the vehicular longitudinal acceleration Gx.

According to the above-described embodiments, when the vehicle speed V is equal to or higher than the end reference value Ve, calculation of an integrated value Vx of the vehicular longitudinal acceleration Gx and abnormality determination of the longitudinal acceleration sensor 54 are finished. The end reference value Ve is lower than the reference value Vdcs for executing the sprung vibration damping control. Accordingly, the decision as to whether or not the longitudinal acceleration sensor 54 is abnormal can be conducted before the sprung vibration damping control is initiated, which enables to prevent the sprung vibration damping control from being initiated under the situation where the longitudinal acceleration sensor 54 is abnormal.

The calculation of an integrated value Vx of the vehicular longitudinal acceleration Gx and the abnormality determination of the longitudinal acceleration sensor 54 can be finished before the sprung vibration damping control is initiated. Accordingly, as compared to where the abnormality determination of the longitudinal acceleration sensor 54 continues after the sprung vibration damping control has been initiated, the load on the electronic control unit 50 and the like can be reduced.

According to the above-described embodiments, under the situation where the decision that the longitudinal acceleration sensor 54 is abnormal is made by the block 64 for determining abnormality, the block 66 for judging stopping the control inhibits a signal indicative of a target torque correction amount ΔTe from being output. Accordingly, when the longitudinal acceleration sensor 54 is abnormal, the sprung vibration damping control is stopped regardless of whether or not any of the drive wheels is under drive slip condition. Therefore, under the situation where an accurate decision as to whether or not any of the drive wheels is under drive slip condition can not be made due to the cause that the longitudinal acceleration sensor 54 is abnormal, the sprung vibration damping control can be prevented from being executed.

According to the above-described embodiments, when the vehicle is in the two-wheel drive state, in step 60 an affirmative decision is made and in step 70 calculation of an integrated value Vx of the vehicular longitudinal acceleration Gx and abnormality determination of the longitudinal acceleration sensor 54 are finished. Therefore, under the situation where the vehicle is in two-wheel drive state and accordingly, the decision as to whether or not any of the drive wheels is under drive slip condition requires no information of the longitudinal acceleration Gx, the abnormality determination of the longitudinal acceleration sensor 54 can reliably be prevented from being unnecessarily conducted.

According to the above-described embodiments, when the vehicle is in the two-wheel drive state, the decision whether or not any one of the drive wheels is under drive slip condition is not conducted in the block 60 for determining a slip but is conducted in the block 62 for determining a slip. That is, the decision whether or not any one of the drive wheels is under drive slip condition is conducted on the basis of an estimated vehicle body speed Vb calculated based on the speed Vi of the driven vehicle wheels and the wheel speeds Vi of the drive vehicle wheels. Under the situation where the block 62 for determining a slip decides that any of the drive wheels is under drive slip condition, the block 66 for judging stopping the control inhibits a signal indicative of a target torque correction amount ΔTe from being output. Accordingly, under the situation where the vehicle is in the two-wheel drive state, the sprung vibration damping control can be prevented from being inappropriately executed due to the cause that any of the drive wheels is under drive slip condition.

Further, according to the above-described embodiments, when the vehicle is in the four-wheel drive state, the vehicle speed Vw based on vehicle wheel speeds Vi is calculated to an average of the higher vehicle wheel speed Vmedh and the lower vehicle wheel speed Vmedl which are two of the four vehicle wheel speeds Vi other than the maximum vehicle wheel speed Vmax and the minimum vehicle wheel speed Vmin. Accordingly, as compared to where the vehicle speed Vw is calculated to an average of the four vehicle wheel speeds Vi, the vehicle speed Vw can more accurately be calculated by means of reducing the influence of vehicle wheel speeds which have assumed peculiar values due to, for example, projections, steps and the like of a road surface.

While the present invention has been described with reference to the above embodiments, it will be apparent to those skilled in the art that the present invention is not limited thereto, but may be embodied in various other forms without departing from the scope of the invention.

For example, in the above-described embodiments, the drive mode of the vehicle is controlled by the 4WD control unit 28 in response to the setting of the selection switch 26 which is operated by a driver. A vehicle to which the abnormality determination device for a longitudinal acceleration sensor according to the present invention and the running control device are applied may be a vehicle the drive mode of which is automatically changed over or a vehicle the drive mode of which is changed over by a change lever operated by a driver.

In the above-described embodiments, the vehicle speed Vw based on vehicle wheel speeds Vi is calculated to an average of the higher vehicle wheel speed Vmedh and the lower vehicle wheel speed Vmedl which are two of the four vehicle wheel speeds Vi other than the maximum vehicle wheel speed Vmax and the minimum vehicle wheel speed Vmin. However, the vehicle speed Vw based on vehicle wheel speeds Vi may be calculated to an average value of the four vehicle wheel speeds Vi or an average value of three vehicle wheel speeds Vi excluding the maximum value Vmax among the four vehicle wheel speeds Vi.

In the above-described embodiments, the ending reference Ve for determining satisfaction of the end condition is a positive constant which is lower than the reference value Vdcs for executing the sprung vibration damping control. However, the ending reference Ve may be set to a value which is equal to or higher than the reference value Vdcs for executing the sprung vibration damping control, and the abnormality determination device for a longitudinal acceleration sensor may be continued after the sprung vibration damping control has been initiated.

In the above-described embodiments, while the running control for a vehicle is the sprung vibration damping control, it may be any control other than the sprung vibration damping control. That is, the abnormality determination device according to the present invention may be applied to any abnormality determination for a longitudinal acceleration sensor in which a value detected by the sensor is utilized in the vehicle running control other than a sprung vibration damping control.

The invention claimed is:

1. An abnormality determination device for a longitudinal acceleration sensor which detects a vehicular longitudinal acceleration that is used in a vehicle running control, the abnormality determination device comprising:

a control unit which calculates an integrated value of the vehicular longitudinal acceleration that is detected by the longitudinal acceleration sensor and determines whether or not the longitudinal acceleration sensor is abnormal on the basis of said integrated value and a vehicle speed based on vehicle wheel speeds, wherein said control unit initiates the calculation of said integrated value when increasing rate of vehicular longitudinal acceleration that is detected by the longitudinal acceleration sensor is equal to or larger than a reference value for the increasing rate and continues for a period which is equal to or larger than a time reference value for initiation of calculation.

2. An abnormality determination device for a longitudinal acceleration sensor according to claim 1, wherein:

when the vehicle speed based on vehicle wheel speeds is lower than a vehicle speed reference value for initiation of determination, said control unit does not determine that said longitudinal acceleration sensor is abnormal, and said vehicle speed reference value for initiation of determination is value which is equal to or higher than a vehicle speed corresponding to a minimum vehicle wheel speed that can be detected.

3. An abnormality determination device for a longitudinal acceleration sensor according to claim 2, wherein:

said control unit conducts said abnormality determination of the longitudinal acceleration sensor by determining whether or not a difference between said integrated value and the vehicle speed based on vehicle wheel speeds is larger than a reference value for abnormality determination, and until the vehicle speed based on vehicle wheel speeds becomes equal to or larger than said vehicle speed reference value for the initiation of determination, said control unit sets said reference value for abnormality determination to a value which prevents a determination from being made that said longitudinal acceleration sensor is abnormal.

4. An abnormality determination device for a longitudinal acceleration sensor according to claim 1, wherein until a time equal to a time reference value for initiation of determination has passed since the time point when said integrated value started increasing, said control unit does not determine that said longitudinal acceleration sensor is abnormal.

5. An abnormality determination device for a longitudinal acceleration sensor according to claim 4, wherein:

said control unit conducts said abnormality determination of the longitudinal acceleration sensor by determining whether or not a difference between said integrated value and the vehicle speed based on vehicle wheel speeds is equal to or larger than a reference value for abnormality determination, and until a time equal to said time reference value for initiation of determination has passed since the time point when said integrated value starts increasing, said control unit sets said reference value for abnormality determination to a value which prevents a determination from being made that said longitudinal acceleration sensor is abnormal.

6. An abnormality determination device for a longitudinal acceleration sensor according to claim 1, wherein said control unit:

conducts a filtering process with a particular band-pass frequency range on the vehicular longitudinal acceleration that is detected by the longitudinal acceleration sensor, and calculates an integrated value of the filtered vehicular longitudinal acceleration.

7. An abnormality determination device for a longitudinal acceleration sensor according to claim 1, wherein said control unit executes said vehicle running control when the vehicle speed based on vehicle wheel speeds is equal to or higher than a vehicle speed reference value for the initiation of the running control, and said vehicle speed reference value for initiation of the running control is higher than said vehicle speed reference value for the initiation of determination.

8. An abnormality determination device for a longitudinal acceleration sensor according to claim 1, wherein said control unit ends the calculation of said integrated value and said abnormality determination of the longitudinal acceleration sensor when the vehicle speed based on vehicle wheel speeds becomes equal to or higher than a vehicle speed reference value for end of determination which is lower than said vehicle speed reference value for initiation of the running control.

9. An abnormality determination device for a longitudinal acceleration sensor according to claim 1, wherein the vehicle is a four-wheel drive vehicle, and the vehicle speed based on vehicle wheel speeds is one of an average value of the four vehicle wheel speeds, an average value of three vehicle wheel speeds other than a maximum value among the four vehicle wheel speeds, and an average value of two vehicle wheel speeds other than maximum and minimum values among the four vehicle wheel speeds.

10. A running control device for a vehicle having an abnormality determination device for a longitudinal acceleration sensor of claim 1 and drive wheels, wherein:

the running control device executes a vehicle running control by controlling driving force of each drive wheel, and stops the vehicle running control when any of the drive wheels is determined to be under slip condition on the basis of the vehicle wheel speeds and a vehicular longitudinal acceleration;

the vehicle is a four-wheel drive vehicle; and when the longitudinal acceleration sensor is determined to be abnormal by said abnormality determination device, said running control device stops said vehicle running control regardless of whether or not any of the drive wheels is under slip condition.

11. A running control device for a vehicle according to claim 10, wherein the vehicle is a four-wheel drive vehicle the mode of which is changeable between four-wheel and two-wheel drive modes, and when the vehicle is in two-wheel drive mode, said abnormality determination device does not execute the abnormality determination of the longitudinal acceleration sensor.

12. A running control device for a vehicle according to claim 11, wherein when the vehicle is in two-wheel drive mode, said running control device conducts the determination as to whether or not any of drive wheels is under slip condition on the basis of vehicle wheel speeds of non-drive and drive wheels.

13. A running control device for a vehicle according to claim 10, wherein said vehicle running control is an sprung vibration damping control for suppressing resonance of a sprung body caused by acceleration and deceleration of the vehicle.

14. An abnormality determination method for a longitudinal acceleration sensor which detects a vehicular longitudinal acceleration that is used in a vehicle running control, the abnormality determination method comprising:

calculating an integrated value of the vehicular longitudinal acceleration that is detected by the longitudinal acceleration sensor; and determining whether or not the longitudinal acceleration sensor is abnormal on the basis of said integrated value and a vehicle speed based on vehicle wheel speeds, wherein the calculation of said integrated value is initiated when increasing rate of the vehicular longitudinal acceleration that is detected by the longitudinal acceleration sensor is equal to or larger than a reference value for the increasing rate and continues for a period which is equal to or larger than a time reference value for initiation of calculation.

15. A running control method for a vehicle having an abnormality determination device for a longitudinal acceleration sensor of claim 1 and drive wheels, and configured to execute a vehicle running control, the method comprising:

controlling the driving force of each drive wheel;

stopping the vehicle running control when any of the drive wheels is determined to be under slip condition on the basis of the vehicle wheel speeds and a vehicular longitudinal acceleration; and utilizing the abnormality determination device, wherein:

the vehicle is a four-wheel drive vehicle, and when the longitudinal acceleration sensor is determined to be abnormal by said abnormality determination device, said vehicle running control is stopped regardless of whether or not any of the drive wheels is under slip condition.

* * * * *